United States Patent
Mangalam et al.

(10) Patent No.: US 8,925,391 B2
(45) Date of Patent: Jan. 6, 2015

(54) SYSTEM AND METHOD FOR DETERMINING FLUID SPEED

(71) Applicant: Tao of Systems Integration, Inc., Hampton, VA (US)

(72) Inventors: Siva M. Mangalam, Williamsburg, VA (US); Arun Mangalam, Williamsburg, VA (US)

(73) Assignee: Tao of Systems Integration, Inc., Hampton, VA (US)

( * ) Notice: Subject to any disclaimer, the term of this patent is extended or adjusted under 35 U.S.C. 154(b) by 209 days.

(21) Appl. No.: 13/667,740

(22) Filed: Nov. 2, 2012

(65) Prior Publication Data

US 2013/0112008 A1 May 9, 2013

Related U.S. Application Data

(60) Provisional application No. 61/555,598, filed on Nov. 4, 2011.

(51) Int. Cl.
*G01F 1/32* (2006.01)
*G01P 5/01* (2006.01)

(52) U.S. Cl.
CPC ............... *G01P 5/01* (2013.01); *G01F 1/3272* (2013.01)
USPC ...................................................... 73/861.22

(58) Field of Classification Search
USPC ......................................... 73/861.22, 861.21
See application file for complete search history.

(56) References Cited

U.S. PATENT DOCUMENTS

| | | | |
|---|---|---|---|
| 3,927,566 A * | 12/1975 | Zanker ....................... | 73/861.22 |
| 3,996,796 A | 12/1976 | Adler et al. | |
| 4,350,047 A * | 9/1982 | Dewey et al. ............... | 73/861.22 |
| 4,485,679 A * | 12/1984 | Pitt et al. .................... | 73/861.22 |
| 4,782,710 A * | 11/1988 | Nagumo et al. ........... | 73/861.22 |
| 5,121,658 A * | 6/1992 | Lew .............................. | 73/195 |
| 5,150,619 A * | 9/1992 | Turner et al. ............... | 73/861.22 |
| 5,218,863 A | 6/1993 | Mangalam | |
| 5,247,838 A * | 9/1993 | Vander Heyden et al. . | 73/861.22 |
| 5,299,455 A | 4/1994 | Mangalam | |
| 5,908,990 A * | 6/1999 | Cummings ................ | 73/861.22 |
| 6,053,053 A * | 4/2000 | Huotari ...................... | 73/861.22 |
| 6,085,587 A * | 7/2000 | Konzelmann ................. | 73/202 |
| 6,101,429 A | 8/2000 | Sarma et al. | |
| 6,134,959 A | 10/2000 | Mangalam et al. | |
| 6,826,493 B1 | 11/2004 | Mangalam | |
| 2005/0049803 A1 | 3/2005 | Mangalam | |

* cited by examiner

*Primary Examiner* — Jewel V Thompson
(74) *Attorney, Agent, or Firm* — Hunton & Williams LLP

(57) ABSTRACT

A flow speed sensor arrangement is provided for measuring a flow speed of a fluid stream relative to an object. The arrangement comprises a first obstructive body having a first forward facing surface and two lateral edges and a second obstructive body having a second forward facing surface. The second obstructive body is positioned in tandem relative to the first obstructive body so that the first and second forward facing surfaces face the same direction and so that when the first forward facing surface is presented to an incoming fluid stream, the first obstructive body is between the incoming fluid flow and the second obstructive body. A sensor array is disposed on the second forward facing surface. The first and second obstructive bodies are attachable to the object so that the first forward face is presented to an incoming fluid stream when the object is immersed in the fluid stream.

22 Claims, 7 Drawing Sheets

SYSTEM AND METHOD FOR DETERMINING FLUID SPEED

CROSS-REFERENCE TO RELATED APPLICATIONS

This application claims priority to U.S. Provisional Application No. 61/555,598 filed Nov. 4, 2011, which is incorporated herein by reference in its entirety.

BACKGROUND OF THE INVENTION

This application relates generally to fluid speed measurement and, more particularly, to a device for measuring the relative speed between a body and a fluid by measuring the shedding frequency from an obstacle placed in the flow. Particular applications of the device include the measurement of airspeed in flight vehicles and the measurement of the relative speed of hydrocraft through water.

Relative fluid speed measurements are required for aerodynamic and hydrodynamic control and, in the case of aircraft, for providing indicated airspeeds for stall speeds, landing speeds, never-exceed speeds, and true airspeeds for navigation, weapons release ballistics and a variety of other uses. Typically, aircraft speed is measured by pitot-static systems which provide indicated airspeed; that is, the ram or dynamic pressure compared to the static pressure for the particular altitude. (Similar measurements may be provided for watercraft using a pitometer.) The indicated airspeed provides information to the pilot for aerodynamic speed control to set such speeds as landing speed, best glide speed, maneuvering speeds and other aerodynamic speeds.

Traditional speed sensors such as pitot tubes, pitometers and impeller logs are highly subject to the effects of solid or liquid materials (e.g., dust, precipitation, insects or other organisms, ice particulates, and other materials (collectively referred to herein as "foreign material" or "foreign objects"). The effects of foreign objects on sensors and other equipment is typically referred to "foreign object damage," or "FOD." FOD can render such sensors inoperative or, potentially worse, inaccurate.

The susceptibility of prior art sensors to FOD is directly related to the fact that operation of these sensors requires that sensor elements being directly exposed to the impinging fluid. Such exposure, by necessity, results in exposing these elements to solid or liquid materials borne by the fluid. FOD can result due to impact, erosion, or material build-up, any of which can degrade or destroy the effectiveness or accuracy of the sensors.

Accordingly, it would be highly beneficial to provide a sensor that does not require direct exposure of the sensor element to the oncoming fluid flow and yet is capable of accurately measuring the speed of the fluid flow relative to the sensor and any object to which the sensor is attached.

SUMMARY OF THE INVENTION

An illustrative aspect of the invention provides a flow speed sensor arrangement for measuring a flow speed of a fluid stream relative to an object immersed in the fluid stream. The arrangement comprises a first obstructive body having a first forward facing surface and two lateral edges and a second obstructive body having a second forward facing surface. The second obstructive body is positioned in tandem relative to the first obstructive body so that the first and second forward facing surfaces face the same direction and so that when the first forward facing surface is presented to an incoming fluid stream, the first obstructive body is between the incoming fluid flow and the second obstructive body. The arrangement further comprises a sensor array disposed on the second forward facing surface. The sensor array comprises at least one sensor element connectable to an anemometer circuit configured to measure changes in a fluid flow parameter. The first and second obstructive bodies are attachable to the object so that the first forward face is presented to an incoming fluid stream when the object is immersed in the fluid stream.

Another illustrative aspect of the invention provides a method of measuring a flow speed of a fluid stream relative to an object immersed in the fluid stream. The method comprises providing a flow sensor arrangement having first and second obstructive bodies positioned in tandem. The first obstructive body has two lateral edges and the second obstructive body has a forward facing surface to which a sensor element is applied. The method further comprises positioning the flow sensor arrangement on the object so that when the object is immersed in the fluid stream, a forward facing surface of the first obstructive body is present to an incoming fluid stream and the first obstructive body is between the incoming fluid stream and the second obstructive body. The method still further comprises immersing the body in the fluid stream, thereby causing an incoming fluid stream to flow around the first obstructive body and produce periodic vortices off the lateral edges of the first obstructive body. The periodic vortices have a vortex shedding frequency. The method also comprises measuring changes in a flow parameter using the sensor element, determining the vortex shedding frequency from the measured flow parameter changes, and determining a flow speed based on the vortex shedding frequency.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments, it will be understood that the invention is not limited to these embodiments. On the contrary, it is contemplated that various alternatives, modifications and equivalents are included within the spirit and scope of the invention as described.

The present invention encompasses methods and systems for determining relative fluid flow speed through the use of a sensor device in which the sensor elements are protected from direct impact of foreign material present in the oncoming flow. By avoiding direct impact by such foreign material, the sensor device operates without loss of measurement accuracy and sensitivity.

As will be discussed in more detail hereafter, a typical embodiment of the invention provides a method of measuring flow speed that involves locating a second obstacle in tandem behind a first obstacle and measuring the shedding frequency with a sensor element embedded on the second obstacle. This approach prevents direct exposure of the sensor element to the oncoming flow and any debris or other material contained in the fluid. It will be understood that while some examples used in this specification relate to aircraft and/or the measurement of airspeed, the principles and methods of the invention may be applied to any fluid and/or object immersed in a fluid, including, in particular, water and watercraft.

Figure 1:
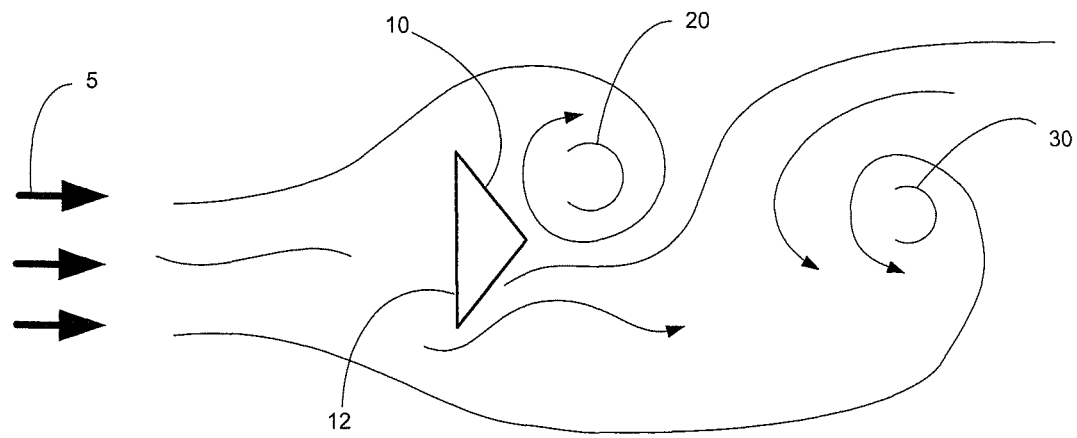
FIG. 1 is a schematic representation of the flow around a wedge.

As is described in U.S. Pat. No. 6,101,429 ('429 Patent), the complete disclosure of which is incorporated herein by reference in its entirety, the linear relationship between fluid speed and vortex shedding from a bluff body can be used to determine the speed of a fluid relative to the body. This has been shown to have particular application in low airspeed measurement and speed sensors for flight applications. In these applications, vortex shedding is created by a specially introduced obstruction to the flow. As illustrated schematically in FIG. 1, free stream air 5 encountering and flowing around a body 10 produces well-defined, periodic vortices 20, 30 shed from the edges of the body 10. In the method described in the '429 Patent, the vortex shedding frequency f is measured by sensors applied to the flow-facing surface 12 of the body 10. The flow speed can then be determined by the linear relationship $$U=(k)(d)(f)$$

where:
k=a dimension-less constant independent of fluid density and velocity;
d=the cross sectional dimension of the wedge (m); and
f=frequency (Hz) of the shed vortices.

The above-described method provides true airspeed independent of density and temperature. As described in the '429 Patent, the sensors may be thin film sensors similar to those described in U.S. Pat. Nos. 5,218,863, 6,134,959, 6,826,493, which are incorporated herein by reference in their entirety. Alternatively, hot wire sensors or other sensors capable of sensing the variations in local heat transfer or pressure sensors capable of sensing pressure changes due to the generation or passage of the periodic vortices may be used.

While the method of the '429 Patent provides a very accurate method for measuring airspeed at low speeds, it may, like other exposed sensor types, experience vulnerability to FOD. Of particular concern is the fragility of the sensor element (e.g., hot-film or hot wire sensor), which makes the sensor vulnerable to destruction by impact with or erosion by foreign materials borne by the fluid impinging on the flow facing surface of the body to which the sensor element is applied. There is also potential for the buildup of foreign material (e.g., ice or dirt) on the sensor, which can result in erroneous speed measurements. Impinging precipitation in the form of rain, sleet, or snow may also affect the sensitivity or reliability of the sensor.

The methods of the present invention avoid the above-described exposure issues while retaining the reliability, accuracy and other advantages of a vortex shedding-based speed sensor. This is accomplished by making use of multiple bodies placed in tandem with respect to the flow direction. For example, a second body may be positioned in the wake of the first body so that the first body shields the second from impingement by foreign material. It has been found that the second body may be sized and positioned so that a sensor placed on a forward surface of the second body will sense the vortices shed from the first body. Thus, the output from a sensor on the second body may be used to determine a vortex shedding frequency that can be used to determine flow speed using the linear relationship discussed above. As will be discussed, the data from such a sensor may also demonstrate a higher signal-to-noise ratio than data from a sensor mounted on the first body.

Depending on the relative size, configuration and positioning of the two bodies, the vortices shed from the first body and the second body may, under certain circumstances, be locked in synchronization (similar to coupled oscillators). In such a case, the signals for a sensor mounted on the second body will provide the same peak frequency as a sensor mounted on the first body.

Figure 2:
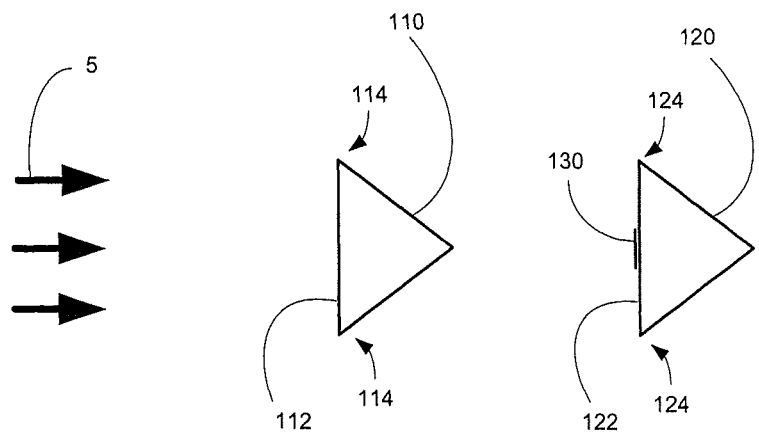
FIG. 2 is a schematic representation of a flow speed sensor system according to an embodiment of the invention.

An exemplary arrangement for a flow speed sensor system 100 according to an embodiment of the invention is shown in FIG. 2. The sensor system 100 comprises a first flow-obstructing body 110 mounted directly in front of a second flow-obstructing body 120 to form a tandem pair. In the illustrated embodiment, the bodies 110, 120 are triangular wedges having forward facing (i.e., facing toward the incoming fluid flow 5) surfaces 112, 122 with lateral edges 114, 124, and rearward facing (i.e., facing away from the incoming fluid flow 5) surfaces comprising side surfaces meeting at trailing apex points 116, 126. The distance between the lateral edges 114 and the lateral edges 124 are the spans or span lengths of the two obstructive bodies 110, 120.

A sensor element 130 is mounted on the forward face 122 of the rear body 120. The sensor element 130 may be or include a thin film sensor similar to those disclosed in the '429 Patent. Other sensors such as those comprising a hot wire or other sensor element capable of registering changes in heat transfer or a pressure sensor that is capable of registering pressure changes due to generation or passage of the shed vortices may be used instead of or in addition to the thin film sensor. Indeed, any sensor capable of measuring a flow parameter whose variation is indicative of the shed vortex frequency may be used. In a particular embodiment, the sensor element 130 is connected to a circuit (e.g., a constant voltage anemometer circuit such as those disclosed in the previously referenced patents), which provides an oscillating voltage having a frequency corresponding to the vortex shedding frequency. It will be understood that the sensor element 130 may be part of an array of two or more sensor elements, each of which may be connected to an anemometer circuit.

As shown in FIG. 2, the sensor element 130 is positioned so that it is not directly exposed to the oncoming flow 5, but instead remains "hidden" in the wake region (i.e., the relatively "dead-air" region) behind the front body 110. In typical low speed flow regimes, this may be accomplished by making the span of the second body 120 less than or equal to that of the front body 110. It will be understood that, despite its position in the wake of the first body 110, the forward facing surface 122 of the second body 120 will still experience the fluid flow and will produce its own vortex shedding. Their tandem positioning, however, assures that the flow from the edges 114 of the first body are sensed by the sensor element 130 mounted on the second body.

Because particulate material or other foreign materials are usually heavier than the fluid in which they are borne, such materials generally fail to follow the streamlines of the flow within the vortices. They will, instead, typically be thrown away from the sensor element 130 due to centrifugal forces as the flow separates from the edge 112 of the front body 110, thereby missing the rear body 120. Thus, neither the forward facing surface 122 of the rear body 120, nor the sensor element 130, is exposed to a direct impact by any foreign object or material.

It will be understood that while a wedge (e.g., a triangular prism) shape may be advantageous from the standpoint of vortex generation and measurement, the obstructive bodies 110, 120 need not be limited to such a shape. Many other cross-sectional shapes may be used, including, but not limited to, rectangles or other regular irregular polygons and ellipses, circles or other regular or irregular closed curves. It will also be understood that while certain size and angle parameters may be used to maximize vortex generation and interaction, the obstructive bodies of the invention are not limited to a particular size or spacing. Further, while in the illustrated embodiment, the two bodies 110, 120 are the same size and have the same cross-sectional shape and area, it will be understood that this need not be the case. The second body 120 need only be sized and positioned so that the sensor element 130 is shielded from fluid borne foreign material yet is still able to sense the vortices shed by the first body.

It can be seen that the present invention effectively mitigates issues with respect to the fragility of sensor elements and the effects of direct exposure to foreign materials, while still maintaining adequate sensitivity for airspeed measurement. Indeed, it has been found that this configuration may provide even greater sensitivity than the system of the '429 Patent. Test data have shown an order-of-magnitude increase may be achieved in peak-to-peak output voltage signals from sensors placed on the rear body.

Figure 3:
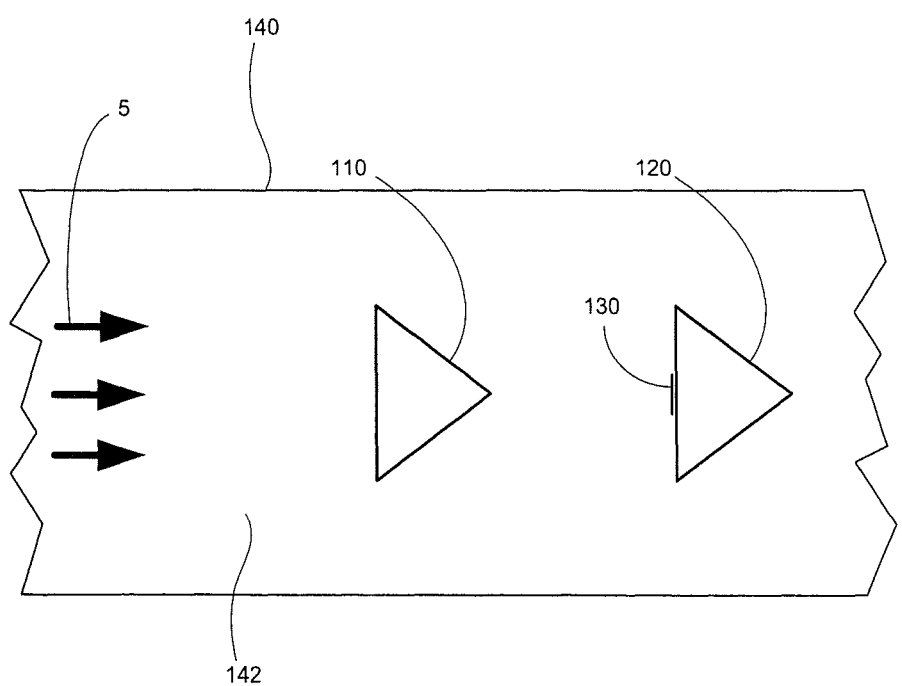
FIG. 3 is a schematic representation of a flow speed sensor system according to an embodiment of the invention.

The sensor system 100 may be positioned along a surface of an object immersed in a fluid or, as shown in FIG. 3, may be housed within a passage 142 of a tube or housing 140 attachable to the object. The tube or housing 140 has an inlet (not shown) in communication with the passage 142 for receiving fluid 5 from the freestream as the fluid moves relative to the object and presenting the fluid 5 to the tandem bodies 110, 120. The tube or housing 140, could, for example, be or be part of a converging-diverging duct or may have a constant cross-section as shown in FIG. 3.

Figure 4:
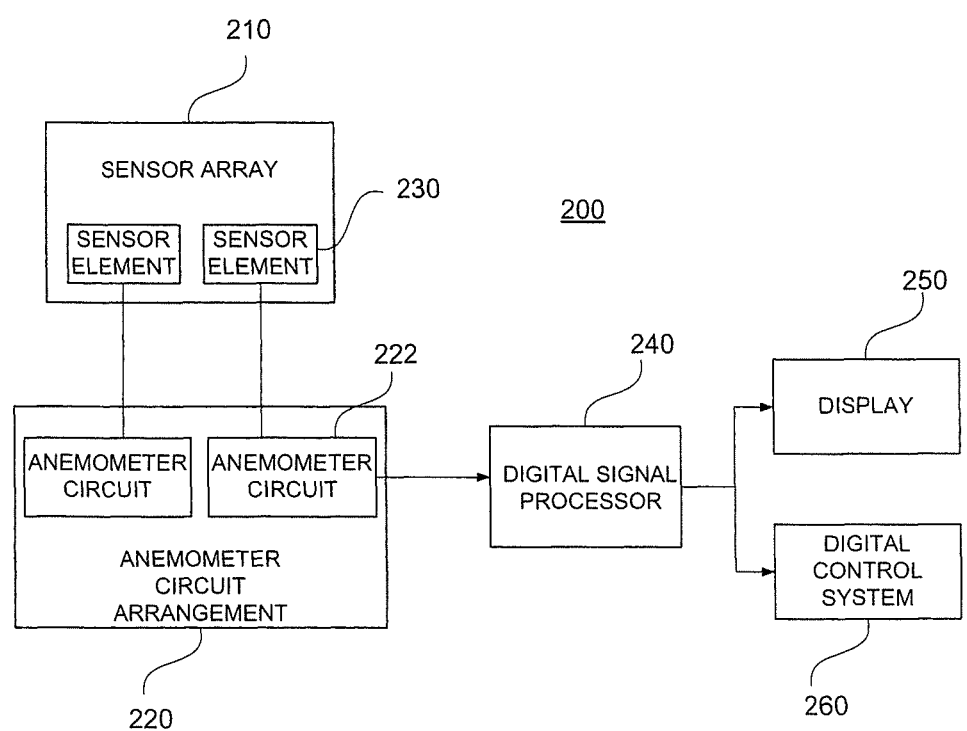
FIG. 4 is a block diagram of a fluid flow speed measurement system according to an embodiment of the invention.

FIG. 4 is a schematic representation of a fluid flow speed measurement system 200 that can be used in conjunction with the methods of the invention. In this system 200, a sensor array 210 comprising one or more sensor elements 230 applied to the forward facing surface of a second obstruction body in a sensor system such as sensor system 100 of FIGS. 2 and 3. As has previously been discussed, these sensor elements 230 may comprise, for example, thin film or hot wire elements. The system comprises an anemometer circuit arrangement 220. Each sensor element 230 is operated by an anemometer circuit 222, which may be configured to use constant voltage methods as described in the previously referenced patents. Voltage changes measured by the sensor elements 230 are sent to a digital signal processor (DSP) 240, which uses the previously determined mathematical relationship between shed vortex frequency and true airspeed (or other relative fluid speed) to calculate the speed (e.g., true airspeed) of the fluid relative to the body to which the sensor elements 230 are attached. The fluid speed may then be sent to a display 250 (e.g., a cockpit display) and/or stored in a data storage module (not shown). The fluid speed may also optionally be sent to a digital control system 260 (e.g., a flight control system).

Figure 5:
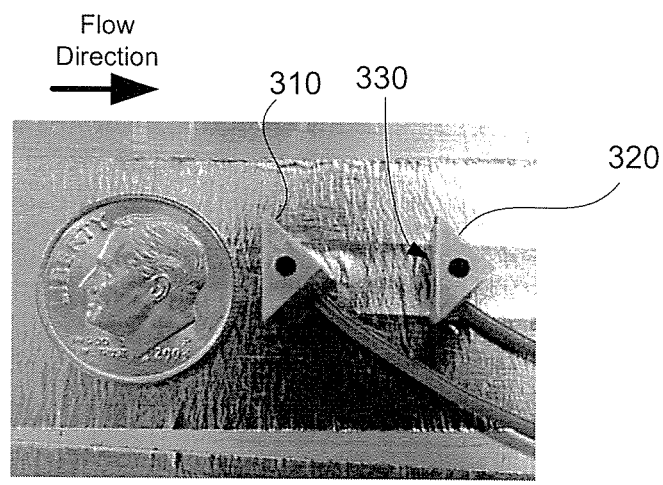
FIG. 5 is a photograph of a tested airspeed sensor arrangement according to an embodiment of the invention.
Figure 6:
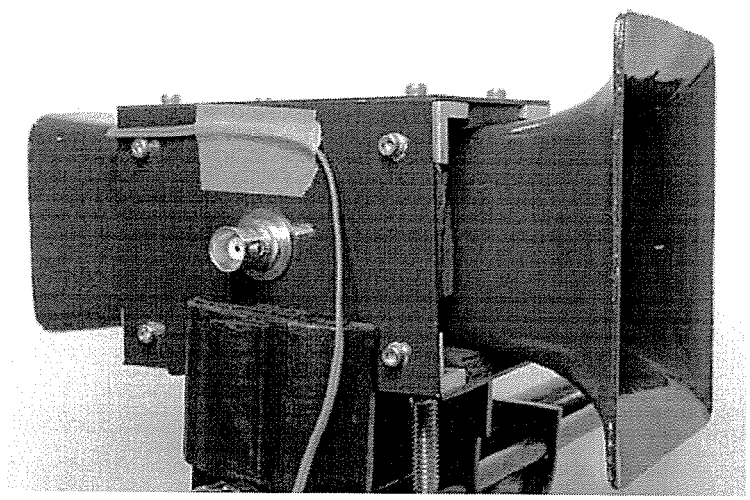
FIG. 6 is a photograph of an enclosure used to house the airspeed sensor arrangement of FIG. 5 during testing.

To demonstrate the effectiveness of the methods of the invention, a sensor system similar to system 100 of FIGS. 2 and 3 was constructed and tested in a low speed (up to 20 M/sec) wind tunnel. The test system was made up of first and second wedges positioned in tandem and placed within a converging/diverging enclosure. FIG. 5 is a photograph of the sensor wedge arrangement showing the positioning of the first wedge 310 and the second wedge 320. The relative size of the two wedges is illustrated by a dime positioned next to the arrangement. A sensor element 330 was positioned on the forward facing surface of the second wedge 320 to measure the shear stress oscillations associated with the vortex shedding from the wedge and determination of the shed vortex frequency. For testing purposes, a sensor element was also attached to the forward facing surface of the first wedge 310. This provided data for a direct comparison of the shed vortex frequency for both wedges. It will be understood that the front wedge was instrumented for experimentation only. Flow measurement devices according to the invention would require a sensor only on the rear obstruction. FIG. 6 is a photograph of the enclosure in which the tandem wedge sensor was disposed for testing.

Figure 7:
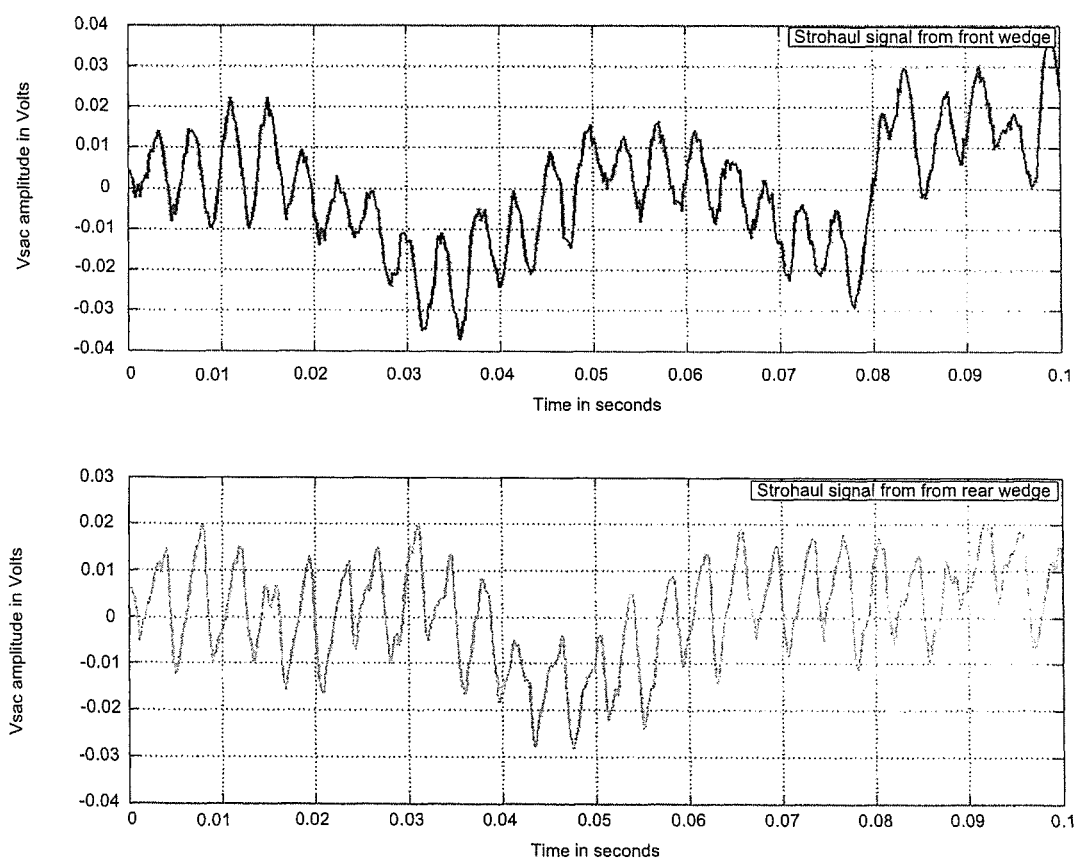
FIG. 7 is a graphical representation of test data obtained using sensors mounted to an airspeed sensor arrangement according to an embodiment of the invention.
Figure 8:
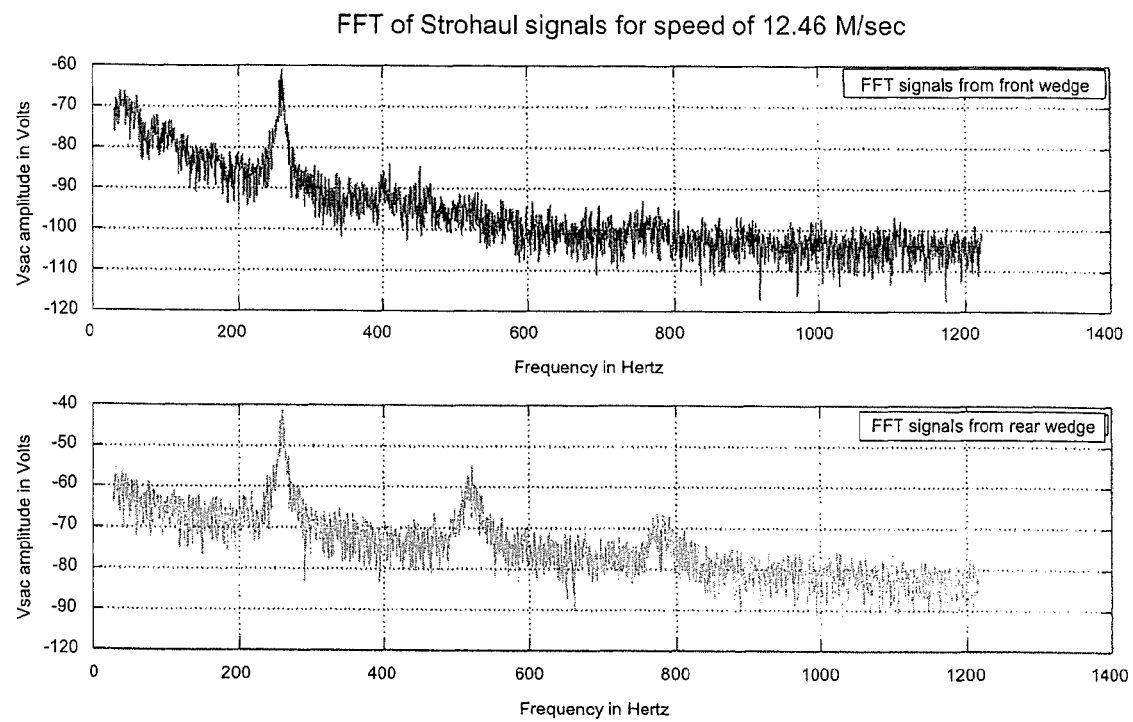
FIG. 8 is a graphical representation of test data obtained using sensors mounted to an airspeed sensor arrangement according to an embodiment of the invention.

FIGS. 7 and 8 show the raw output signals and the signal spectra from the two sensor elements for an airspeed of 12.46 M/sec. The peak-to-peak output voltage for the front wedge sensor is 20 mV and that for the rear wedge sensor is 200 mV, an order of magnitude higher. Thus, in this case, not only is the sensor on the rear wedge not directly exposed to the flow, it is also significantly more sensitive and consequently has a much higher signal-to-noise ratio.

Figure 9:
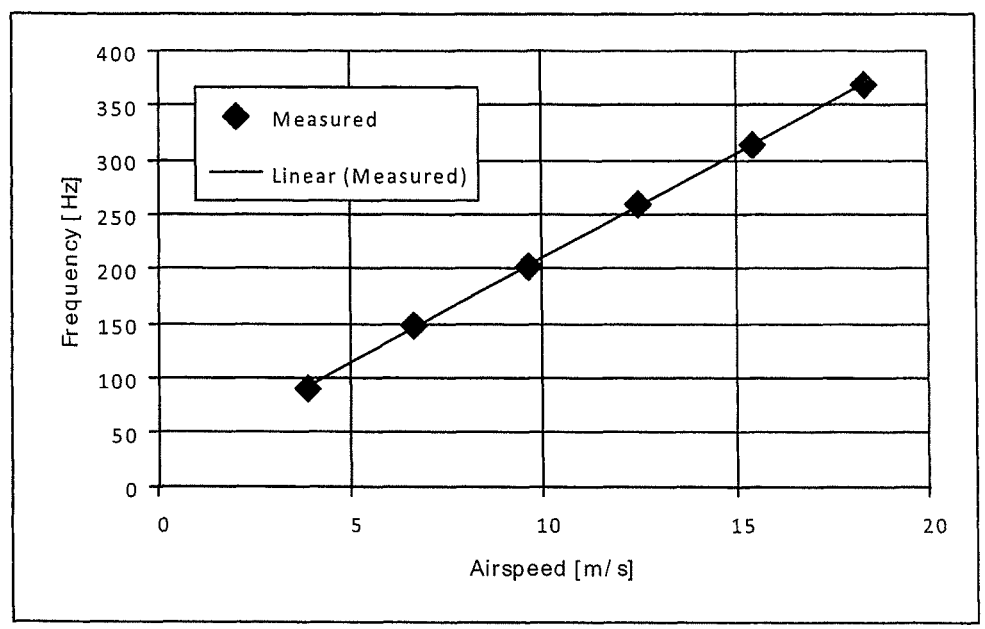
FIG. 9 is a graphical representation of test results obtained for an airspeed sensor arrangement according to an embodiment of the invention.

FIG. 9 shows the Strouhal frequency versus airspeed for the sensor element mounted on the rear wedge. As expected, the Strouhal frequency varies linearly with airspeed.

Accordingly, a flow sensor device according to the present invention may comprise a pair of tandemly mounted obstructions and a flow sensor mounted to the rear obstruction. The flow sensor may be positioned and configured to allow measurement of a flow parameter that exhibits the shear stress oscillations associated with the vortex shedding frequency and is operatively connected or connectable to a data processor adapted to process the signals from the sensor and determine fluid flow speed based on a previously determined correlation between flow speed and Strouhal frequency. Furthermore, the tandem sensor configuration may provide an order of magnitude increase in sensitivity (signal-to-noise ratio) without sacrificing accuracy.

Devices of the present invention are not limited to a particular size, fluid or flow regime. The size of each obstruction and the relative distance between them may, however, be subject to particular design considerations such as desired speed range and the shape and size of the enclosure within which the obstructions are placed.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A sensor system for measuring a flow speed of a fluid stream relative to an object immersed in the fluid stream, the system comprising:
 a first obstructive body having a first forward facing surface and two lateral edges defining a first body span;
 a second obstructive body having a second forward facing surface and two lateral edges defining a second body span, the second obstructive body being positioned in tandem relative to the first obstructive body so that the first and second forward facing surfaces face the same direction and so that when the first forward facing surface is presented to an incoming fluid stream, the first obstructive body is between the incoming fluid flow and the second obstructive body; and
 a sensor array disposed on the second forward facing surface, the sensor array comprising at least one sensor element configured to measure changes in a fluid flow parameter over the sensor element,
 wherein the first and second obstructive bodies are attachable to the object so that the first forward face is presented to an incoming fluid stream when the object is immersed in the fluid stream.

2. A sensor system according to claim 1 wherein at least one of the first and second obstructive bodies has a cross-section selected from the group consisting of a regular polygon, an irregular polygon, an ellipse, and an irregular closed curve.

3. A sensor system according to claim 1 wherein at least one of the first and second obstructive bodies is wedge-shaped with rearward facing angled surfaces meeting at a trailing apex point.

4. A sensor system according to claim 1 wherein a cross-section of the first obstructive body is the same as a cross-section of the second obstructive body.

5. A sensor system according to claim 1 wherein the second body span is less than or equal to the first body span.

6. A sensor system according to claim 1 wherein the first forward facing, surface is positionable so that it is substantially perpendicular to the incoming fluid stream when the object is immersed in the fluid stream.

7. A sensor system according to claim 1 wherein the at least one sensor element comprises a thin film heat transfer sensor connectable to a constant voltage anemometer circuit.

8. A sensor system according to claim 1 wherein the flow parameter is one of the set consisting of a heat transfer parameter and a pressure parameter.

9. A sensor system according to claim 1 wherein the obstructive bodies are sized and configured and the sensor element is configured according to at least one characteristic of the fluid.

10. A sensor system according to claim 1 wherein the fluid stream is primarily air.

11. A sensor system according to claim 1 wherein the fluid stream is primarily a liquid.

12. A sensor system according to claim 1 further comprising:
 a housing connectable to the object and defining a passage in which the first and second obstructive bodies are disposed, the housing being configured for receiving the fluid stream into the passage for presentation to the obstructive bodies.

13. A method of measuring a flow speed of a fluid stream relative to an object immersed in the fluid stream, the method comprising:
 providing a flow sensor arrangement having first and second obstructive bodies positioned in tandem, each obstructive body having two lateral edges and the second obstructive body having a forward facing surface to which a sensor element is applied;
 positioning the flow sensor on the object so that when the object is immersed in the fluid stream, a forward facing surface of the first obstructive body is presented to an incoming fluid stream and the first obstructive body is between the incoming fluid stream and the second obstructive body;
 immersing the body in the fluid stream, thereby causing an incoming fluid stream to flow around the first and second obstructive bodies;
 measuring changes in a flow parameter using the sensor element;
 determining a vortex shedding frequency from the measured flow parameter changes; and
 determining a flow speed based on the vortex shedding frequency.

14. A method according to claim 13 wherein the action of determining a flow speed includes:
 calculating the flow speed based on an empirically determined mathematical correlation between flow speed and vortex shedding frequency.

15. A method according to claim 14 further comprising:
 determining the mathematical correlation between flow speed and vortex shedding frequency by testing the flow sensor arrangement at multiple flow speeds.

16. A method according to claim 13 wherein the fluid stream is primarily air.

17. A method according to claim 13 wherein the fluid stream is primarily a liquid.

18. A method according to claim 13 wherein the actions of determining a vortex shedding frequency and determining a flow speed are carried out by a data processor.

19. A flow speed measurement system for measuring a flow speed of a fluid stream relative to an object immersed in the fluid stream, the system comprising:
 a flow sensor arrangement having first and second obstructive bodies positioned in tandem, each obstructive body having two lateral edges and the second obstructive body having a forward facing surface to which a sensor element is applied;
 an anemometer arrangement in communication with the flow sensor arrangement, the anemometer arrangement being configured for operating the sensor arrangement to obtain flow parameter data; and
 a digital signal processor in communication with the anemometer arrangement, the digital signal processor being configured for determining a vortex shedding frequency from the flow parameter data and for determining a flow speed based on the vortex shedding frequency.

20. A flow speed measurement system according to claim 19 wherein the digital signal processor is further configured for selective communication with one of the set consisting of a display and a digital control system for transmission of the flow speed thereto.

21. A sensor system according to claim 1 wherein the first obstructive body is wedge-shaped with first rearward facing angled surfaces meeting at a first trailing apex point and the second obstructive body is wedge-shaped with second rearward facing angled surfaces meeting at a second trailing apex point.

22. A sensor system according to claim 1 wherein the first and second forward facing surfaces are planar surfaces positionable so as to be substantially perpendicular to the incoming fluid stream when the object is immersed in the fluid stream.

\* \* \* \* \*